(12) United States Patent
Kim et al.

(10) Patent No.: US 7,835,337 B2
(45) Date of Patent: Nov. 16, 2010

(54) METHOD FOR TRANSMITTING DOWNLINK CONTROL INFORMATION

(75) Inventors: So Yeon Kim, Gyeonggi-do (KR); Jae Hoon Chung, Gyeonggi-do (KR); Ji Ae Seok, Gyeonggi-do (KR); Moon Il Lee, Gyeonggi-do (KR); Hyun Soo Ko, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/363,522

(22) Filed: Jan. 30, 2009

(65) Prior Publication Data

US 2009/0225737 A1  Sep. 10, 2009

Related U.S. Application Data

(60) Provisional application No. 61/024,889, filed on Jan. 30, 2008.

(30) Foreign Application Priority Data

Sep. 16, 2008  (KR)  ........................ 10-2008-0090733

(51) Int. Cl.
   *H04B 7/212*  (2006.01)
(52) U.S. Cl. ........................ 370/342; 370/338
(58) Field of Classification Search ............. 370/334, 370/342
   See application file for complete search history.

(56) References Cited

U.S. PATENT DOCUMENTS

| | | | |
|---|---|---|---|
| 6,505,046 B1 * | 1/2003 | Baker ...................... 455/456.3 |
| 7,391,755 B2 * | 6/2008 | Gopalakrishnan et al. ... 370/334 |
| 2001/0029465 A1 * | 10/2001 | Strisower ...................... 705/14 |
| 2004/0047321 A1 * | 3/2004 | Bui .............................. 370/338 |
| 2004/0062221 A1 | 4/2004 | Gopalakrishnan et al. |
| 2007/0260956 A1 | 11/2007 | Terry et al. |
| 2008/0165873 A1 * | 7/2008 | Ghosh et al. ................. 375/261 |
| 2008/0186934 A1 * | 8/2008 | Khan et al. .................. 370/342 |

FOREIGN PATENT DOCUMENTS

| KR | 10-2004-0039849 A | 5/2004 |
|---|---|---|
| KR | 10-2006-0085076 A | 7/2006 |
| KR | 10-2007-0087618 A | 8/2007 |

* cited by examiner

*Primary Examiner*—Nick Corsaro
*Assistant Examiner*—Amanuel Lebassi
(74) *Attorney, Agent, or Firm*—Lee, Hong, Degerman, Kang & Waimey

(57) ABSTRACT

A method for efficiently transmitting downlink control information is described. A method for transmitting control information in a multiple antenna system which can simultaneously transmit a maximum of two codewords includes transmitting modulation and coding scheme (MCS) information, a new data indicator (NDI) and a redundancy version (RV) for information blocks transmitted through the two codewords, and transmitting additional control information including at least one of a swapping indicator and enable/disable information. The swapping indicator indicates whether or not swapping occurs between the information blocks transmitted through the two codewords, and the enable/disable information indicates whether or not any one of transmissions through the two codewords is disabled. The swapping indicator is reserved when any one of transmissions through the two codewords is disabled, thereby reducing signaling overhead and efficiently transmitting necessary information.

6 Claims, 10 Drawing Sheets

【FIG. 1】
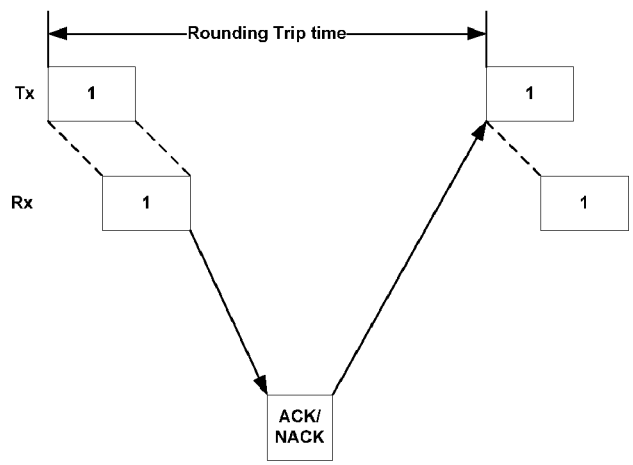
【FIG. 2】
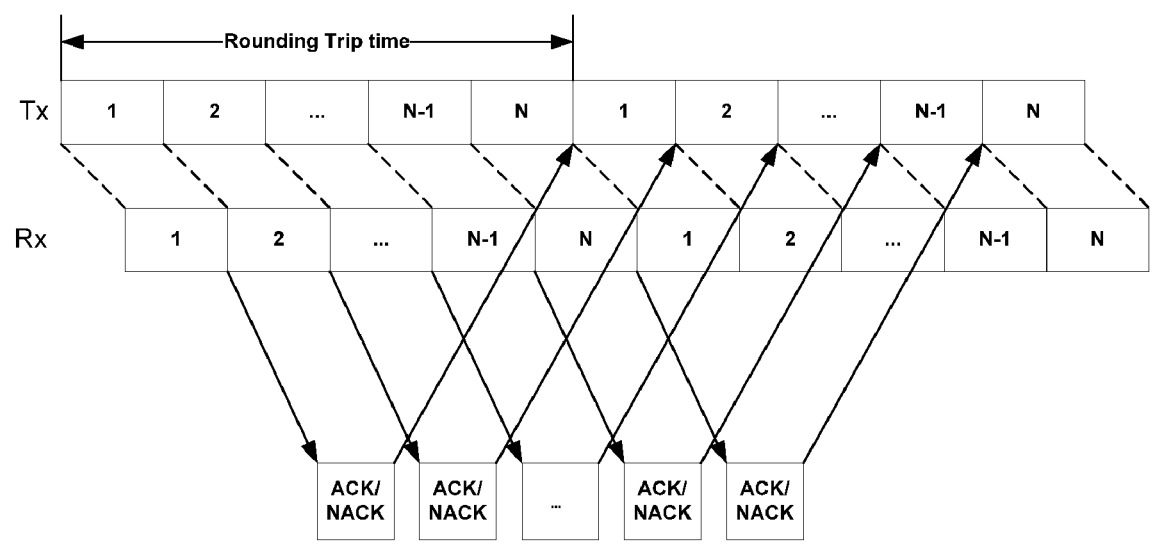

[FIG. 9]
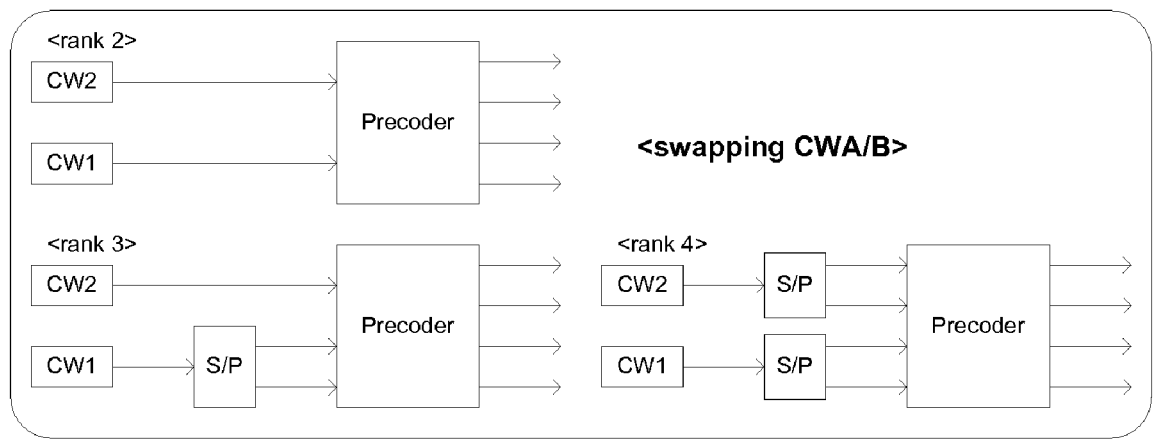

METHOD FOR TRANSMITTING DOWNLINK CONTROL INFORMATION

CROSS-REFERENCE TO RELATED APPLICATIONS

This application claims the benefit of the U.S. Provisional Application No. 61/024,889, filed on Jan. 30, 2008, which is hereby incorporated by reference as if fully set forth herein.

This application claims the benefit of the Korean Patent Application No. 10-2008-0090733, filed on Sep. 16, 2008, which is hereby incorporated by reference as if fully set forth herein.

BACKGROUND OF THE INVENTION

1. Technical Field

The present invention relates to a multiple antenna communication system, and more particularly to a method for efficiently transmitting downlink control information which includes codeword swapping information and codeword enable/disable information.

2. Discussion of the Related Art

Error control algorithms, which are currently used in communication systems, may be broadly classified into an automatic repeat request (ARQ) scheme and a forward error correction (FEC) scheme. The ARQ scheme includes stop-and-wait ARQ, go-back-N ARQ, selective repeat ARQ, etc. Stop-and-wait ARQ refers to a scheme for confirming whether a transmitted frame has been accurately received and then transmitting a next frame. Go-back-N ARQ refers to a scheme for transmitting N successive data frames, and if transmission is not successful, all data frames followed by an error-generated frame are re-transmitted. Selective repeat ARQ refers to a scheme for selectively re-transmitting only error-generated frames.

Meanwhile, hybrid automatic repeat request (HARQ) refers to an error control scheme combining re-transmission and error correction that maximizes error correction coding capabilities of data received during re-transmission. HARQ may be divided into chase combining (CC) HARQ and incremental redundancy (IR) HARQ according to characteristics of transmitted bits during re-transmission. CC HARQ obtains a gain by raising a signal-to-noise ratio (SNR) in a receiving side using data used for primary transmission during re-transmission. IR HARQ gains a coding gain in a receiving side by combining redundancy bits during re-transmission to improve performance.

FIG. 1 is a view explaining the concept of a stop-and-wait ARQ scheme in HARQ.

In a stop-and-wait ARQ protocol, a determination as to whether to re-transmit data is made by individually receiving an acknowledgement (ACK)/negative acknowledgement (NACK) signal from a receiving side after one process block is transmitted. Although the stop-and-wait ARQ scheme is the simplest and most efficient transmission method, link transmission efficiency is lowered by a round trip time (RTT) until a transmitting side receives the ACK/NACK signal from the receiving side.

FIG. 2 is a view explaining an N-channel stop-and-wait HARQ protocol scheme.

The N-channel stop-and wait HARQ protocol scheme performs N independent stop-and-wait HARQ operations for a time during which a transmission link is not used until an ACK/NACK signal is transmitted and received in order to overcome a shortcoming described with reference to FIG. 1. The N-channel stop-and-wait HARQ protocol scheme can reduce a processing delay.

Meanwhile, a multiple-input multiple-output (MIMO) scheme increases system capacity by simultaneously transmitting multiple data streams spatially using two or more transmit/receive antennas in a base station and a mobile terminal. The MIMO scheme can obtain a transmit diversity gain or a beamforming gain using multiple transmit antennas.

A transmit diversity scheme transmits the same data through multiple transmit antennas for reliable data transmission in fast time-varying channel environments and has an advantage of being achieved even without channel-related feedback information from a receiver. A beamforming scheme is used to increase a signal to interference plus noise ratio (SINR) of a receiver by multiplying weighting values by multiple transmit antennas. In general, since a frequency division duplex (FDD) system has independent uplink and downlink channels, high reliability channel information is required to obtain a proper beamforming gain and therefore additional feedback information received from the receiver is used.

A spatial multiplexing scheme for a single user and for multiple users will be described in brief.

FIG. 3 is a view illustrating the concept of spatial multiplexing and spatial divisional multiple access schemes used in a MIMO communication system.

Spatial multiplexing for a single user is called SM or single user (SU)-MIMO and transmits data using a plurality of antennas for one user as shown in the left side of FIG. 3. Therefore, the capacity of a MIMO channel increases in proportion to the number of antennas. Meanwhile, spatial multiplexing for multiple users is called spatial division multiple access (SDMA) or multi-user (MU)-MIMO and transmits and receives data through a plurality of user antennas as shown in the right side of FIG. 3.

A MIMO scheme includes a single codeword (SCW) method which simultaneously transmits N data streams using one channel encoding block and a multiple codeword (MCW) method which transmits N data streams using M (where M is equal to or less than N) channel encoding blocks. Each channel encoding block generates independent codewords and each codeword is designed to be able to independently detect errors.

On the other hand, the above-described codeword is transmitted through one or more layers and information transmitted through codewords may be swapped for transmission. In a wireless communication system which can simultaneously transmit a plurality of codewords, a specific codeword may be disabled.

SUMMARY OF THE INVENTION

Therefore, the present invention has been made in view of the above problems, and it is an object of the present invention to provide a method for efficiently transmitting downlink control information which includes codeword swapping information and codeword enable/disable information in a multiple antenna communication system.

The object of the present invention can be achieved by a method for transmitting control information in a multiple antenna system which can simultaneously transmit a maximum of two codewords. The method includes transmitting modulation and coding scheme (MCS) information, a new data indicator (NDI) and a redundancy version (RV) for information blocks transmitted through the two codewords, and transmitting additional control information including at least one of a swapping indicator and enable/disable information, the swapping indicator indicating whether or not swapping occurs between the information blocks transmitted through the two codewords, and the enable/disable information indicating whether or not any one of transmissions through the two codewords is disabled, wherein the swapping indicator is reserved when any one of transmissions through the two codewords is disabled.

In another aspect of the present invention, provided herein is a method for receiving control information in a multiple antenna system which can simultaneously receive a maximum of two codewords. The method includes receiving modulation and coding scheme (MCS) information, a new data indicator (NDI) and a redundancy version (RV) for information blocks transmitted through the two codewords, and receiving additional control information including at least one of a swapping indicator and enable/disable information, the swapping indicator indicating whether or not swapping occurs between the information blocks transmitted through the two codewords, and the enable/disable information indicating whether or not any one of transmissions through the two codewords is disabled, wherein the swapping indicator is reserved when any one of transmissions through the two codewords is disabled.

The additional control information may indicate four states cases, including a first state in which the information blocks transmitted through the two codewords are transmitted without swapping, a second state in which the information blocks transmitted through the two codewords are transmitted with swapping, and third and fourth states in which one of the information blocks transmitted through the two codewords is transmitted through one enabled codeword when any one of transmissions through the two codewords is disabled.

When the two codewords are all enabled, the swapping indicator may be transmitted within downlink control information as one-bit explicit information, and the enable/disable information may be implicitly transmitted to a receiving side by one or more combinations of the NDI, the RV, and the MCS information.

In a multiple antenna communication system according to the embodiments of the present invention, downlink control information which includes codeword swapping information and codeword enable/disable information can be efficiently transmitted.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 is a view explaining the concept of a stop-and-wait ARQ scheme in HARQ;

FIG. 2 is a view explaining an N-channel stop-and-wait HARQ protocol scheme;

FIG. 9 is a view illustrating the concept of transmission through swapping of codewords according to an exemplary embodiment of the present invention.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and/or devices are omitted or are shown in block diagram form, focusing on important features of the structures and/or devices, so as not to obscure the concept of the present invention. The same reference numbers will be used throughout this specification to refer to the same or like parts.

The present invention provides a method for efficiently transmitting downlink control information which includes codeword swapping information and enable/disable information in a multiple antenna communication system. To this end, a codeword transmission relationship in a multiple antenna system, and generally necessary control information for downlink transmission will be described. Next, a method for efficiently transmitting the swapping information and codeword enable/disable information will be described.

Figure 3:
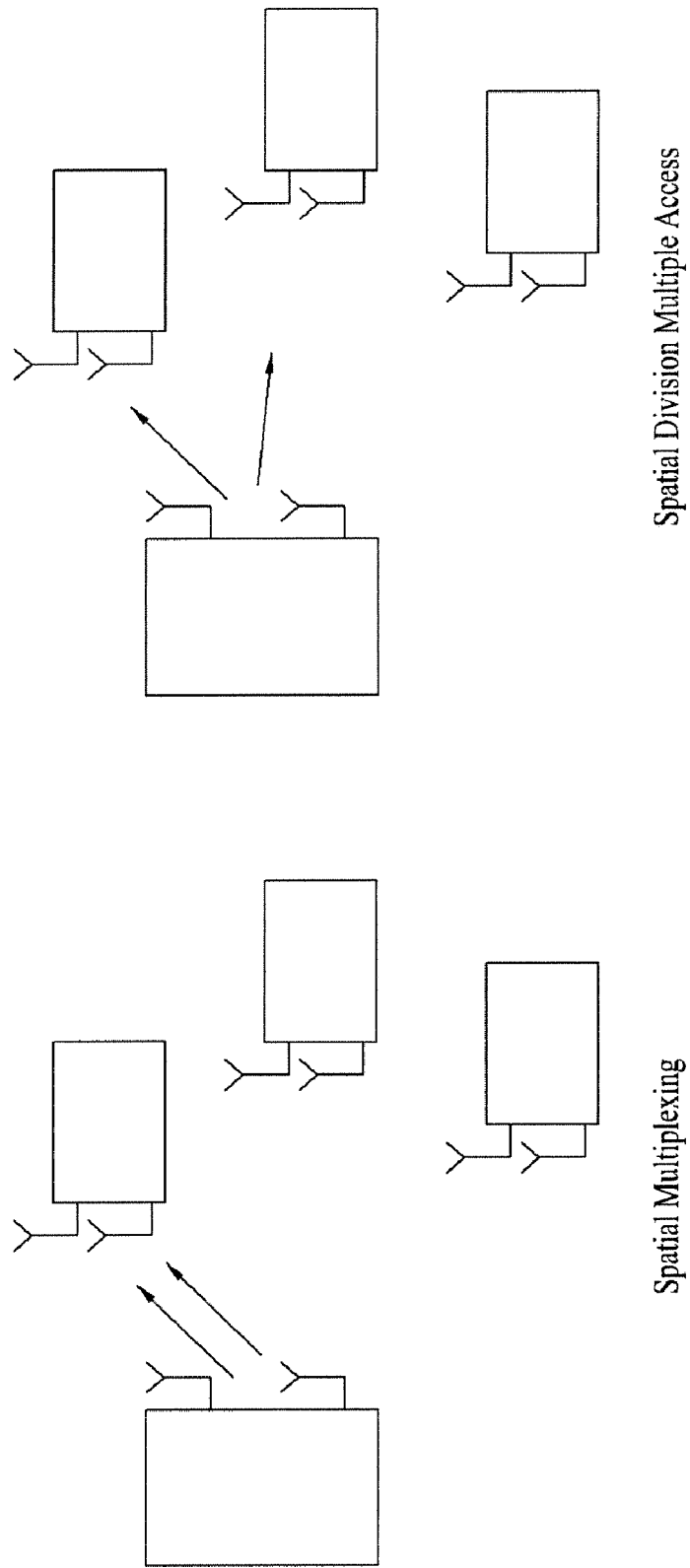
FIG. 3 is a view illustrating the concept of spatial multiplexing and spatial divisional multiple access schemes used in a MIMO communication system.
Figure 4:
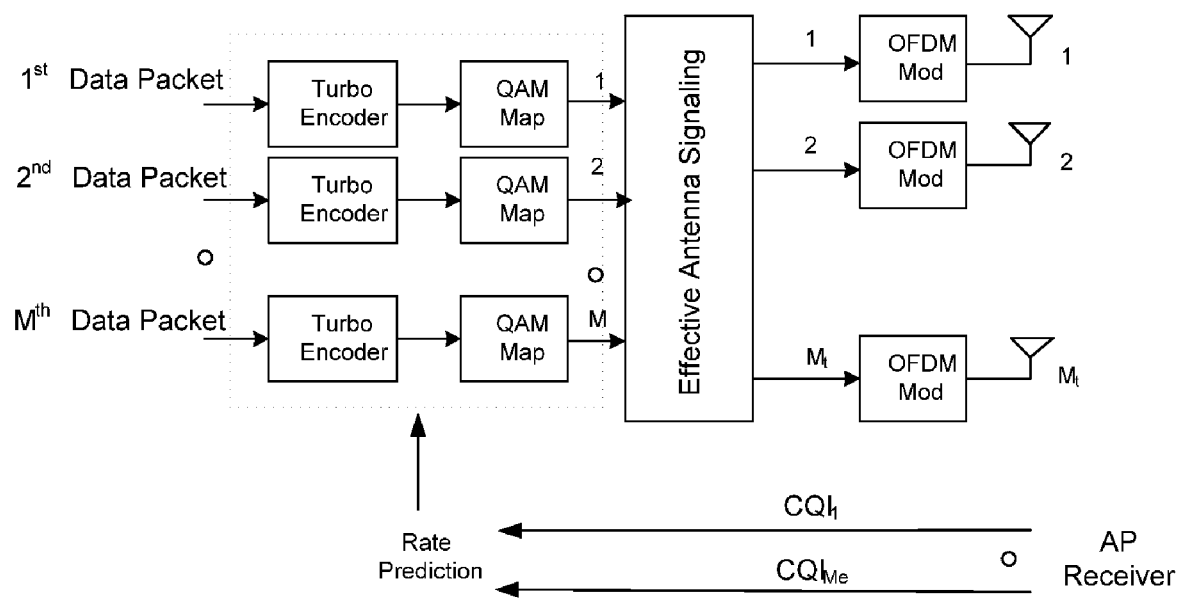
FIG. 4 is a view illustrating a structure of a transmitting side of a MIMO system using multiple codewords.

FIG. 4 is a view illustrating a structure of a transmitting side of a MIMO system using multiple codewords.

Specifically, M data packets are generated as M codewords through encoding (for example, turbo encoding as shown in FIG. 4) and modulation (for example, quadrature amplitude modulation (QAM) as shown in FIG. 4). Each codeword has an independent HARQ process block. M modulated data symbols are simultaneously encoded in a MIMO side according to a multiple antenna scheme and are transmitted through respective physical antennas. A receiving side can control a spatial multiplexing rate, a coding rate, and a modulation scheme by feeding back channel quality information about a multiple antenna channel state.

For MIMO transmission shown in FIG. 4, there are needed modulation and coding scheme (MCS) information used by the transmitting side, a new data indicator (NDI) indicating whether transmitted data is new data or re-transmitted data, redundancy version (RV) information as to which subpacket is re-transmitted upon re-transmission, and the like.

Meanwhile, a mapping relationship between codewords and physical antennas may have an arbitrary form.

Figure 5:
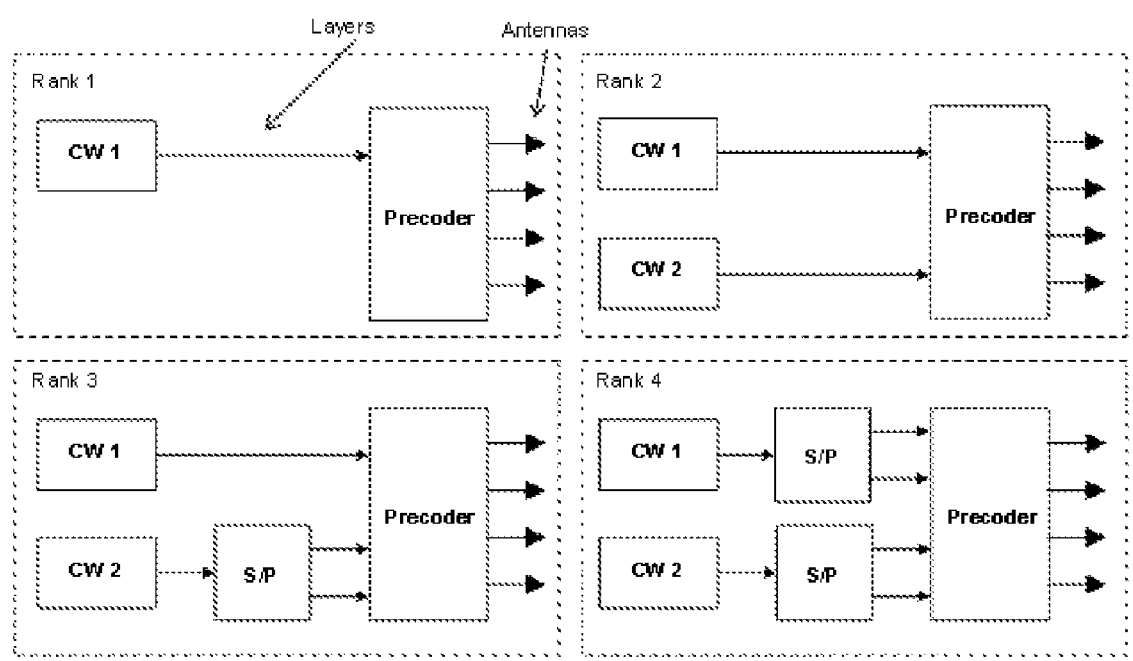
FIG. 5 is a view illustrating mapping relationships between codewords and physical antennas.

FIG. 5 is a view illustrating mapping relationships between codewords and physical antennas.

Specifically, FIG. 5 illustrates cordword-to-layer mapping according to a spatial multiplexing rate in a downlink in 3GPP TS 36.211. When a spatial multiplexing rate is 1, one cordword is mapped to one layer, and data generated in one layer is encoded by a preceding scheme so as to be transmitted through four antennas. When a spatial multiplexing rate is 2, two codewords are mapped to two layers and then mapped to four antennas by a precoder. For a spatial multiplexing rate of 3, one of two codewords is mapped to two layers by a serial-to-parallel (S/P) converter. As a result, a total of two codewords are mapped to three layers and then mapped to four antennas by a precoder. If a spatial multiplexing rate is 4, each of two codewords is mapped to two layers by an S/P converter. Consequently, a total of four layers are mapped to four antennas by a precoder.

Namely, a base station having four transmit antennas can have a maximum of four layers and four independent codewords. However, FIG. 5 illustrates a system configured to have a maximum of only two codewords. Therefore, assuming that in the system shown in FIG. 5, each codeword has an independent HARQ process, a maximum of two independent HARQ processes can be transmitted.

Meanwhile, the precoder is usually expressed by a matrix of the number of transmit antennas Mt by a spatial multiplexing rate v and adaptively uses a preceding matrix employing a set of a matrix predetermined by a transmitter and a receiver according to circumstances. A set of such a preceding matrix is called a codebook. The following Table 1 and Table 2 illustrate examples of a codebook used in downlink in 3GPP TS 36.211.

TABLE 1

| Codebook Index | Number of layers v | |
|---|---|---|
| | 1 | 2 |
| 0 | $\begin{bmatrix} 1 \\ 0 \end{bmatrix}$ | $\frac{1}{\sqrt{2}}\begin{bmatrix} 1 & 0 \\ 0 & 1 \end{bmatrix}$ |
| 1 | $\begin{bmatrix} 0 \\ 1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ 1 \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -1 \end{bmatrix}$ | — |
| 4 | $\frac{1}{\sqrt{2}}\begin{bmatrix} 1 \\ j \end{bmatrix}$ | — |
| 5 | $\frac{1}{\sqrt{2}}\begin{bmatrix} 1 \\ -j \end{bmatrix}$ | — |

TABLE 2

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Specifically, Table 1 illustrates a codebook used in a two-antenna system (2-Tx system) and Table 2 illustrates a codebook used in a four-antenna system (4-Tx system).

Meanwhile, in a stop-and-wait HARQ scheme, a data receiving side confirms whether data has been successfully received through an error detection code such as a cyclic redundancy check (CRC) For convenience of description, a data unit in which an error can be detected will be referred to as 'HARQ process block'. An identifier used to discriminate between HARQ process blocks which can be transmitted within a predetermined interval of a system, that is, within an RTT will be referred to as 'HARQ process number'.

Upon detecting no errors in data, a receiving side transmits an ACK signal, and upon detecting an error, the receiving side transmits an NACK signal. The data transmitting side receiving the ACK signal transmits the next data. The data transmitting side receiving the NACK signal re-transmits corresponding data in which an error has occurred. The re-transmitted data may change a format thereof according to a HARQ type.

If a transmission bandwidth is wide or data is transmitted using multiple antennas, a plurality of HARQ process blocks may be simultaneously transmitted.

Figure 6:
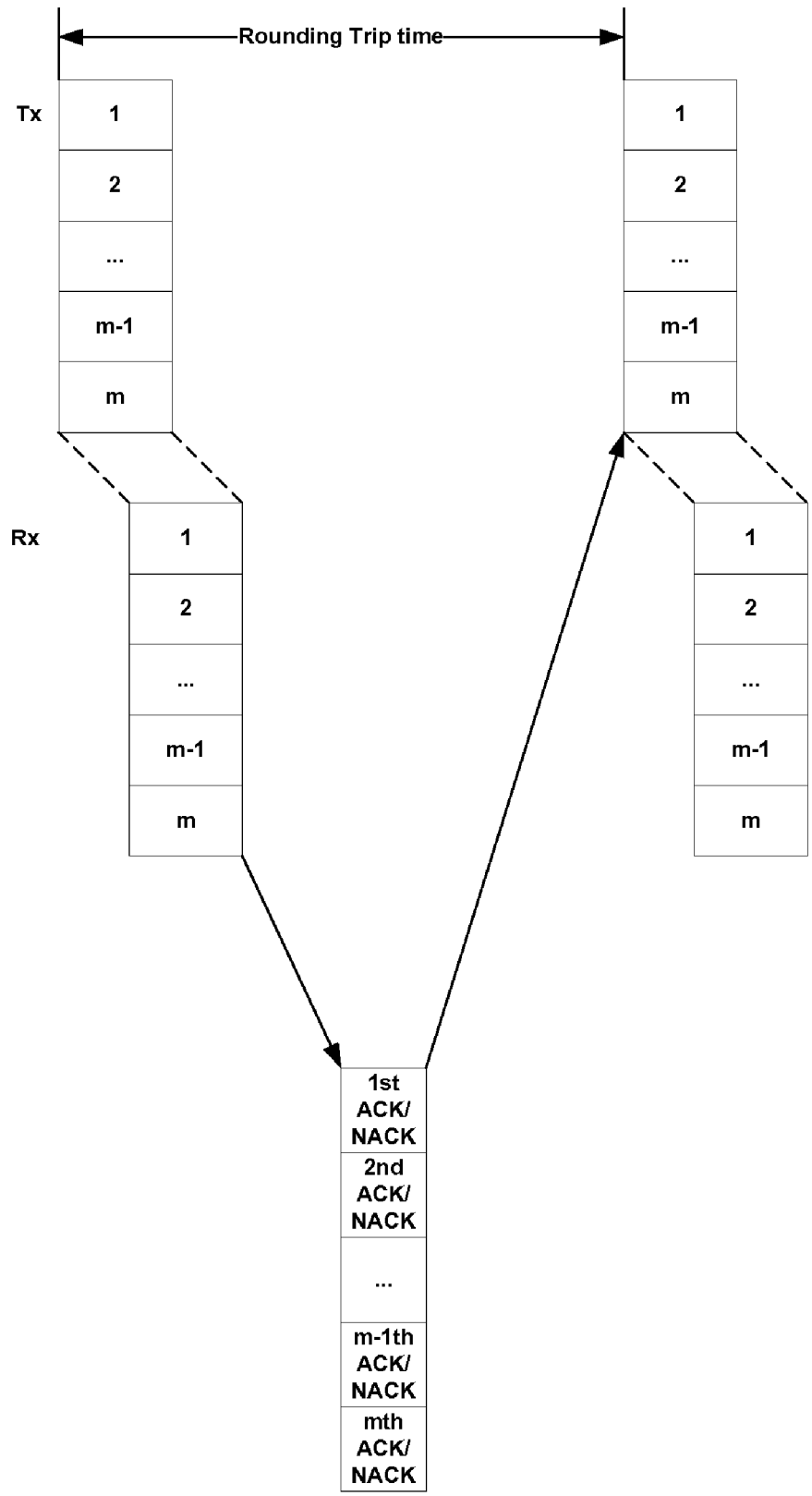
FIG. 6 is a view explaining a multiple HARQ scheme in which m HARQ process blocks are simultaneously transmitted and an ACK/NACK signal for each HARQ process block is received.

FIG. 6 is a view explaining a multiple HARQ scheme in which m HARQ process blocks are simultaneously transmitted and an ACK/NACK signal for each HARQ process block is received.

A transmitting side may simultaneously transmit m HARQ process blocks in a given transmission unit as illustrated in FIG. 6. A receiving side which has received data may transmit m ACK/NACK signals for the m HARQ process blocks to the transmitting side. Efficient data transmission may be applied by combining the multiple stop-and-wait HARQ scheme as shown in FIG. 6 with the N-channel stop-and-wait HARQ scheme described with reference to FIG. 2.

Namely, the number of combinations of HARQ process numbers which may be generated in a system which can operate a maximum of n HARQ process blocks within an RTT and simultaneously transmit m HARQ process blocks is as follows.

$$_{mn}P_m + _{mn}P_{(m-1)} + _{mn}P_{(m-2)} + \cdots + _{mn}P_2 + _{mn}P_1 \text{ combinations} \quad \text{[Equation 1]}$$

The number x of bits of control signaling for expressing combinations of all HARQ process numbers is as follows.

$$\{\min(x) | 2^x \geq {_{mn}P_m} + {_{mn}P_{(m-1)}} + {_{mn}P_{(m-2)}} + \cdots + {_{mn}P_2} + {_{mn}P_1}, x \text{ is an integer}\} \quad \text{[Equation 2]}$$

Meanwhile, if the number of simultaneously transmitted HARQ process blocks, i.e., the number of simultaneously used layers is indicated through any signal, the number x of bits of control signaling for expressing combinations of HARQ process numbers is as follows.

$$\{\min(x) | 2^x \geq \max({_{mn}P_m}, {_{mn}P_{(m-1)}}, {_{mn}P_{(m-2)}}, \ldots, {_{mn}P_2}, {_{mn}P}), x \text{ is an integer}\} \quad \text{[Equation 3]}$$

As a method for reducing overhead of such control information, N bits which have been used to discriminate between HARQ process IDs in a single-input multiple-output (SIMO) may also be used in MIMO.

Figure 7:
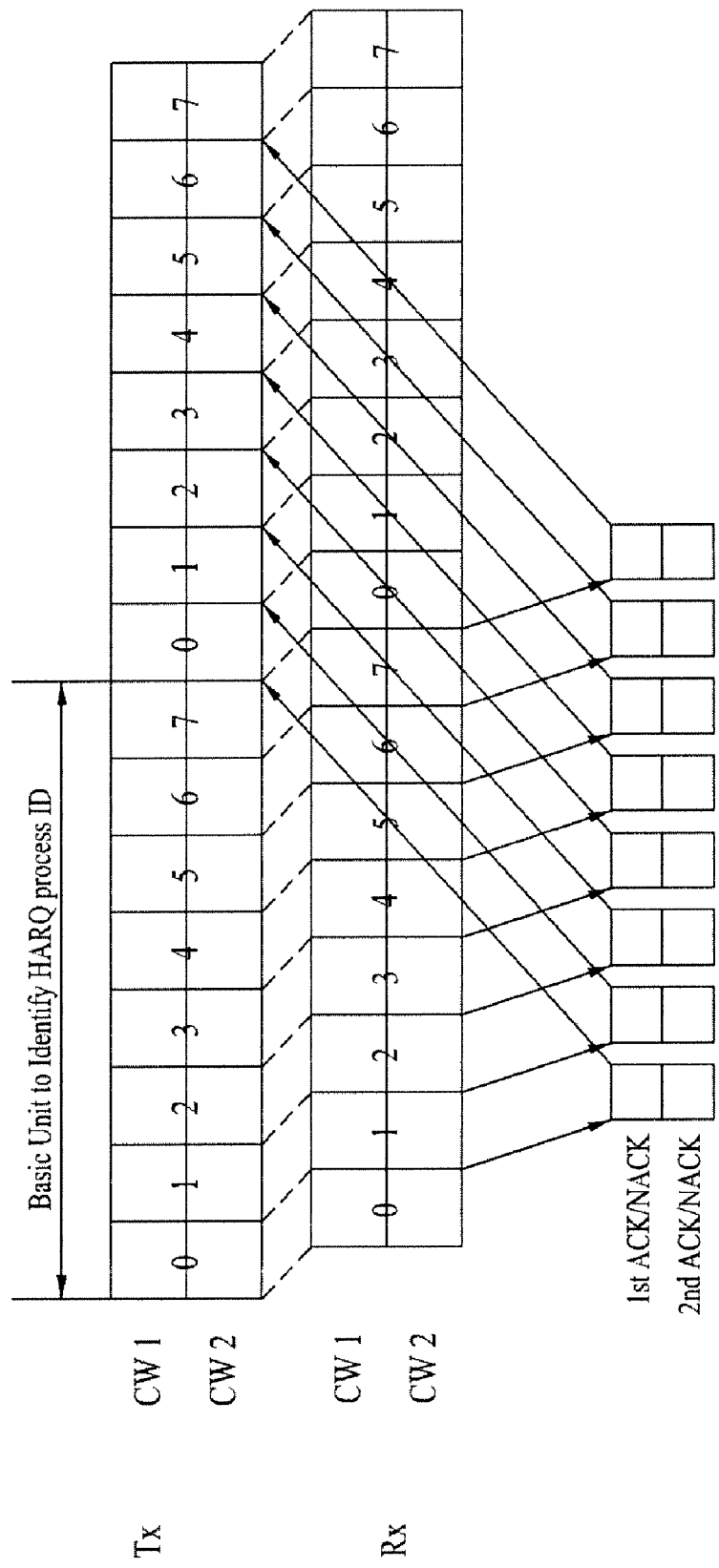
FIG. 7 is a view explaining a method for setting simultaneously transmitted HARQ process blocks to share HARQ process numbers.

FIG. 7 is a view explaining a method for setting simultaneously transmitted HARQ process blocks to share HARQ process numbers.

Specifically, in FIG. 7, a maximum of 8 HARQ process blocks can be operated during an RTT, and a maximum of 16 HARQ process blocks can be transmitted during an RTT because two layers can be simultaneously used. In FIG. 7, since simultaneously transmitted HARQ process blocks share HARQ process numbers 0 to 7, HARQ process numbers can be expressed using only 3-bit control information.

For the MIMO transmission described with reference to FIG. 4, and the layer mapping, preceding, and HARQ process number signaling described with reference to FIG. 5, the following control information has been discussed to be used in a 3GPP LTE system.

TABLE 3

| | Field | Bits | Comment |
|---|---|---|---|
| General | RB assignment | Undetermined | Number of bits depends on the resource indication scheme selected (if necessary, includes any explicit information to handle distributed transmission). |
| | CRC | 16-20 | MAC ID implicitly encoded in the CRC. The MAC ID is 16 bits. |
| | TPC | 2-4 | Power control of PUCCH |
| First transport block | Transport format | 4-7 | Approach 1: signal MCS, compute transport block size from resource block assignment. Approach 2: signal transport block size index and modulation scheme, compute code rate and actual transport block size from resource block assignment (similar to HSDPA). |
| | Hybrid ARQ process number | 3 | Depends on the number of HARQ processes used, TDD may need a larger/smaller number than FDD for certain allocations → different PDCCH sizes for FDD and TDD. |
| | Retransmission sequence number (RSN) | 2-3 | Approach 1: RSN (2 bits) doubles as new data indicator (=0 indicates new data, >0 indicates retransmission) and redundancy version). Approach 2: Separate new data indicator (1 bit) and redundancy version (2 bits). |
| | Information needed for spatial multiplexing SU-MIMO support | | |
| | Information needed for MU-MIMO is FFS | | |
| Second transport block | Number of layers | 0-2 | 1, 2, 3 or 4 layers (4 Tx eNodeB) or 1, 2 layers (2 Tx eNodeB). The need depends on the rank adaptation |

TABLE 3-continued

| Field | | Bits | Comment |
|---|---|---|---|
| (MIMO support) | | | scheme adopted. |
| | Transport format | 3-7 | Approach 1: signal MCS, compute transport block size from resource block assignment. Approach 2: signal transport block size index and modulation scheme, compute code rate and actual transport block size from resource block assignment (similar to HSDPA). Approach 3: obtained relative to the transport format for the first code word. |
| | Hybrid ARQ process number | 0 | According to minutes from RAN1#47bis, there is full flexibility in mapping between HARQ process and codewords. The understanding of "full flexibility" was different between companies. To be considered if the process number could be derived from first transport block e.g. as in Rel-7. |
| | Retransmission sequence number (RSN) | 0-3 | Approach 1: RSN (2 bits) doubles as new data indicator (=0 indicates new data, >0 indicates retransmission) and redundancy version. Approach 2: Separate new data indicator (1 bit) and redundancy version (2 bits). |
| | Precoding information | Undetermined | — |

However, the above described control information form may have the following problems.

For example, it is assumed that a maximum of two codewords can be transmitted and a multiple antenna system has four transmit antennas. If a spatial multiplexing rate is 4, a first codeword CW1 may be transmitted through first and second layers, and a second codeword CW2 may be transmitted through third and fourth layers. In this case, an error can be detected in units of a codeword. If an error is detected only in the first codeword CW1 and the codewords should be transmitted with a spatial multiplexing rate of 2 due to variations of channel environments at a re-transmission time point, the error-generated codeword CW1 can not employ an HARQ scheme such as chase combining.

Moreover, if transmission of the second codeword CW2 is completed and thus a buffer of the codeword CW2 is empty, it is difficult to properly cope with the case where only the codeword CW1 is transmitted even though the spatial multiplexing rate is 4.

Further, in sharing a plurality of HARQ process blocks which is simultaneously transmitted in a MIMO mode by one HARQ process number, if locations of data mapped to layers are changed due to antenna selection or rank adaptation during re-transmission or one data unit is transmitted, it is not possible to recognize the HARQ process blocks only by the HARQ process number.

To solve the above-described shortcomings, the exemplary embodiment of the present invention proposes a method of transmitting null data to a specific codeword.

Figure 8A:
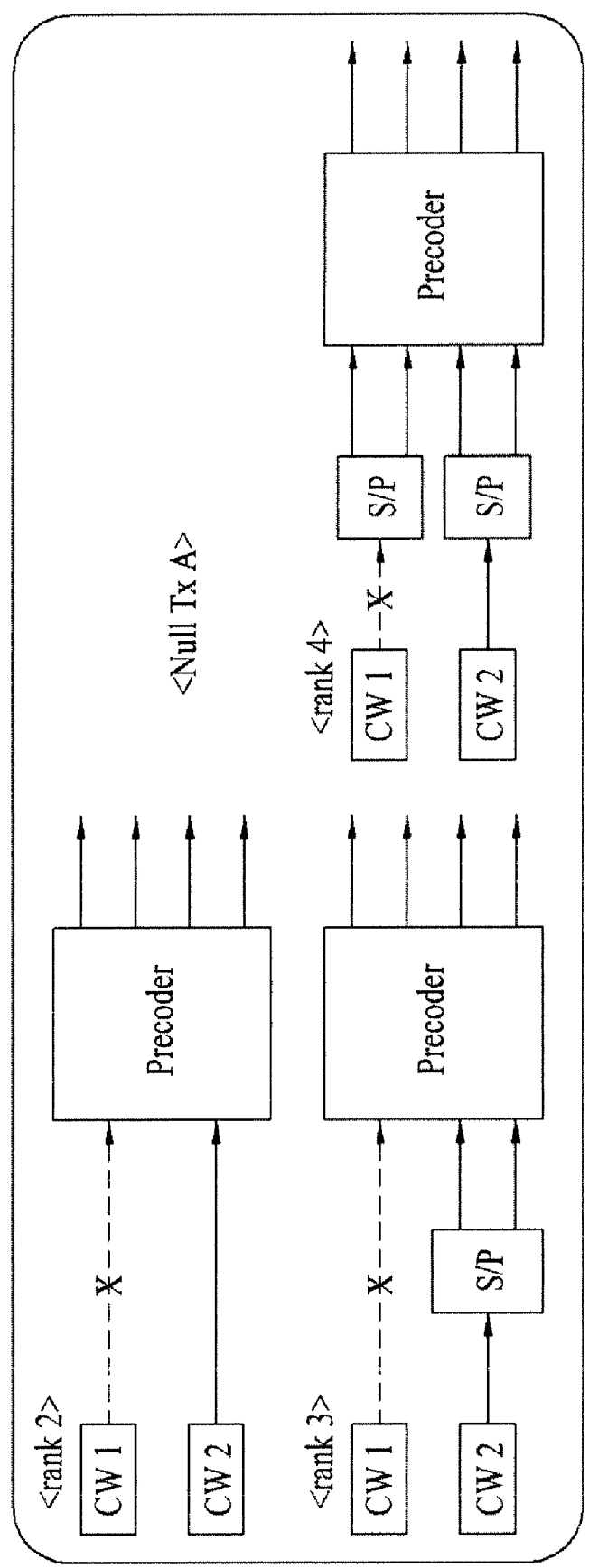
FIGS. 8A and 8B illustrate the concept of transmitting null data through a specific cordword according to an exemplary embodiment of the present invention.
Figure 8B:
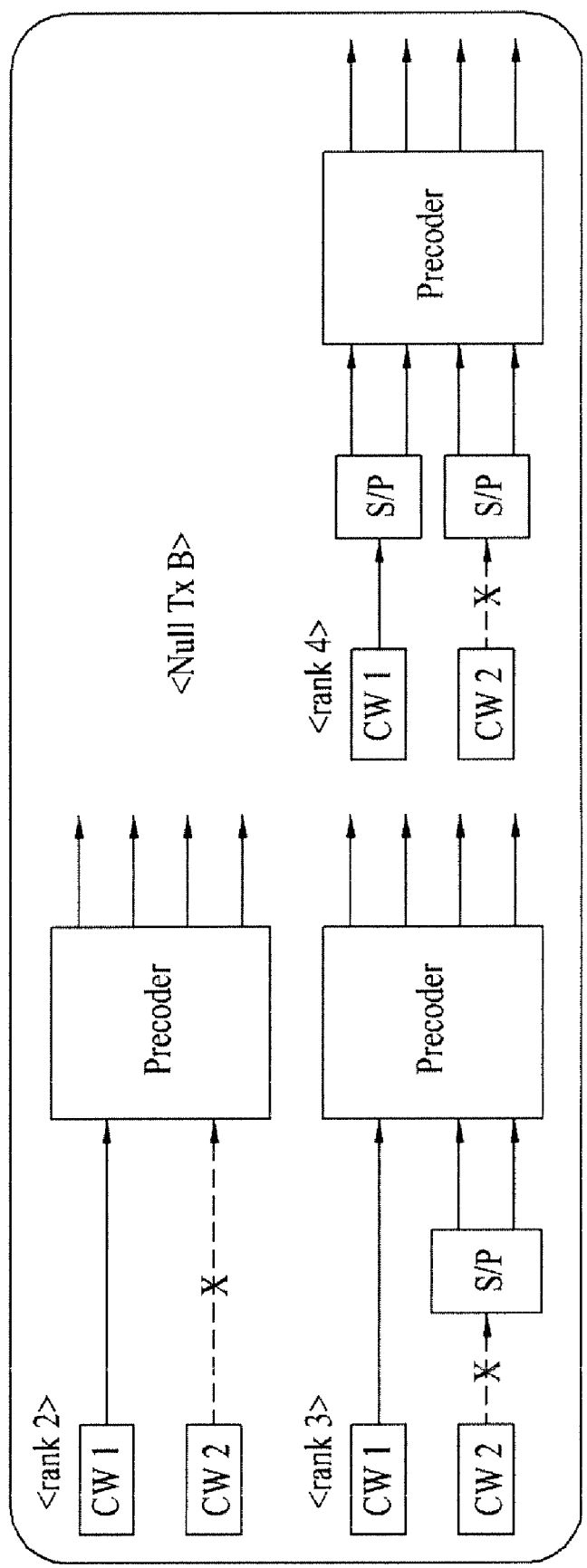

FIGS. 8A and 8B illustrate the concept of transmitting null data through a specific cordword according to an exemplary embodiment of the present invention.

Specifically, FIGS. 8A and 8B illustrate the concept of transmitting null data through one codeword, when a buffer of one codeword is empty or a spatial multiplexing rate of a channel is decreased under the circumstances that data is transmitted with a spatial multiplexing rate of 2 or more among the layer mapping relationships shown in FIG. 5. In FIG. 8A, null data is transmitted through a codeword CW1, and in FIG. 8B, null data is transmitted through a codeword CW2.

The above method seemingly uses a multiple antenna scheme as if two codewords are all used, but in actuality a spatial multiplexing rate may be set to be small due to null data. Transmission of null data through a specific codeword may be expressed as disabling of a corresponding codeword. Disabling of a specific codeword includes disabling of a codeword itself (the case where null data is transmitted) and disabling of information transmitted through each codeword. For example, FIGS. 8A and 8B show disabling of the codeword itself CW1 or but have a concept including the case where the size of a first or second transport block mapped to the codeword CW1 or CW2 is 0.

The exemplary embodiment of the present invention proposes to interchangeably transmit locations of the codewords CW1 and CW2.

FIG. 9 is a view explaining the concept of transmission through swapping of codewords according to an exemplary embodiment of the present invention.

In FIG. 9, swapping of transmission locations of codewords CW1 and CW2 is shown when two or more codewords are transmitted among the layer mapping relationships shown in FIG. 5. In the exemplary embodiment of the present invention, swapping assumes the concept including the case where locations of information mapped to the codewords are interchangeably transmitted as well as the case where transmission locations of two codewords themselves are changed. For example, when transport blocks are mapped to respective codewords for transmission, change of locations of the transport blocks mapped to the codewords as well as change of transmission locations of the codewords themselves is included in the concept of swapping according to the present invention.

Therefore, indexing of the HARQ process block as shown in FIG. 7 is proposed to be changed as follows.

Figure 10:
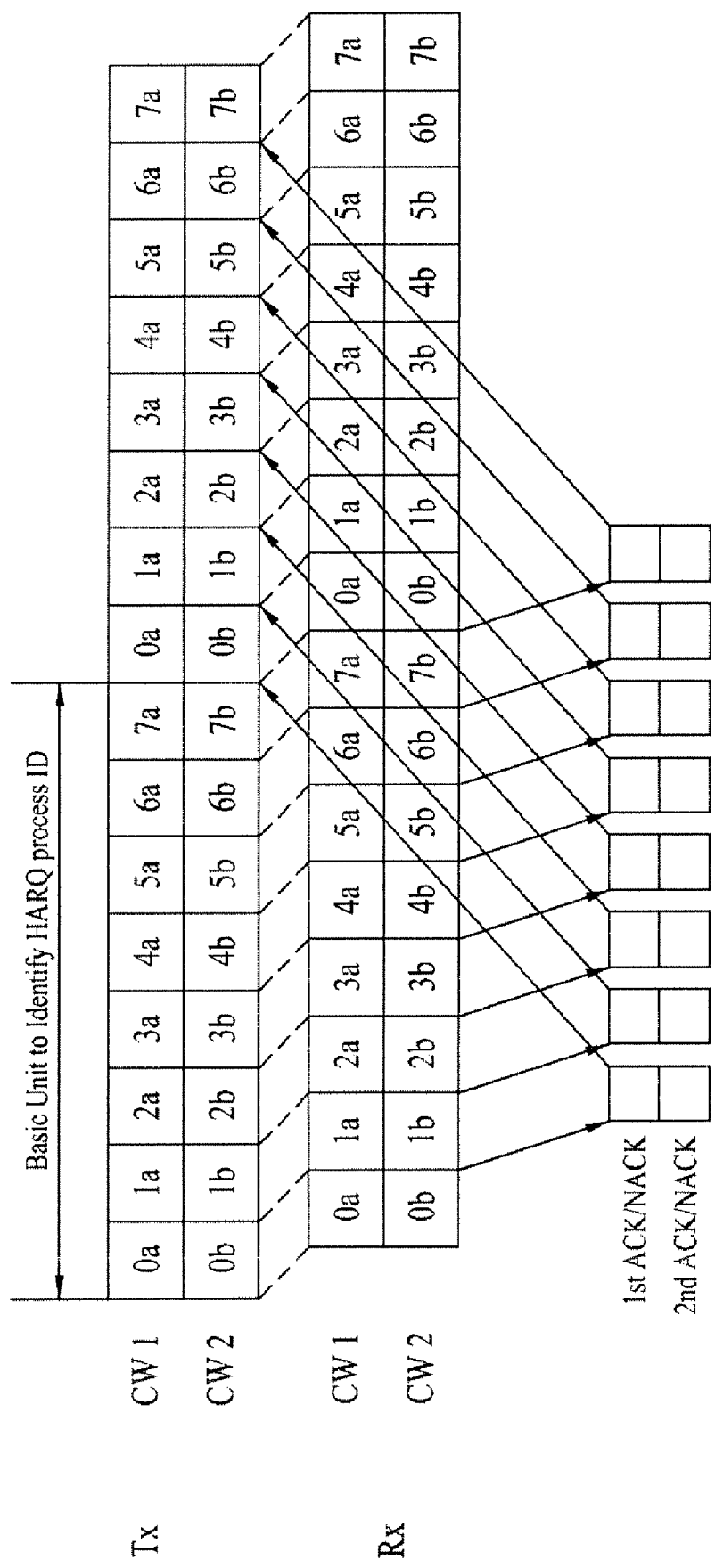
FIG. 10 is a view explaining concept for discriminating between simultaneously transmitted HARQ process blocks and allowing swapping of simultaneously transmitted HARQ process blocks and transmission of null data according to an exemplary embodiment of the present invention.

FIG. 10 is a view explaining concept for discriminating between simultaneously transmitted HARQ process blocks and allowing swapping of simultaneously transmitted HARQ process blocks and transmission of null data according to an exemplary embodiment of the present invention.

That is, simultaneously transmitted HARQ process blocks are discriminated by 'a' and 'b', and even during re-transmission, the HARQ process blocks are discriminated by 'a' and 'b'.

When mapping each HARQ process block to a layer, it is preferable to be able to swap layer mapping of 'a' and 'b'.

To this end, it is proposed to transmit additional control information for discriminating between the following 6 states to a receiving side.

TABLE 4

| Index | Content |
|---|---|
| 1 | (no swapping CWA/B) |
| 2 | (swapping CWA/B) |
| 3 | (no swapping/null Tx A) |
| 4 | (no swapping/null Tx B) |
| 5 | (swapping/null Tx A) |
| 6 | (swapping/null Tx B) |

In Table 4, 'swapping' denotes change of transmission locations of codewords or exchange of information mapped to respective codewords, and 'null Tx' denotes transmission of null data to a cordword CWA or CWB or disabling of a transport block mapped to each codeword.

Such information may be explicitly or implicitly expressed when being represented in a control information field. For example, the control information field for expressing the cases of Table 4 in Table 3 may be explicitly added. When considering all possible cases, 3-bit control information is needed to represent 6 cases.

However, since the 3-bit control information for expressing 6 cases is the number of bits which can represent 8 cases, the 3-bit control information can be interpreted as including some overhead in representing 6 cases. Therefore, it is proposed that 6 cases of Table 4 be reduced to 4 cases of the following Table 5, thereby reducing overhead and maintaining similar performance.

TABLE 5

| Index | Content |
|---|---|
| 1 | (no swapping CWA/B) |
| 2 | (swapping CWA/B) |
| 3 | (no swapping/null Tx A) |
| 4 | (no swapping/null Tx B) |

Specifically, in Table 5, two cases are omitted from the cases of Table 4 by reserving use of a swapping function when a codeword CWA or CWB is disabled. Namely, if any one codeword is disabled, since swapping of transmission locations of codewords is less favorable than transmission of two codewords, this exemplary embodiment proposes to reserve a swapping function when any one codeword is disabled.

As described previously, state information of four cases of Table 5 may be transmitted through explicit signaling or may be implicitly transmitted through other control information.

The exemplary embodiment of the present invention proposes to indicate swapping or no swapping using 2-bit retransmission sequence number (RSN) field information of Table 3. For example, an RSN field of 0 may be set to indicate that swapping is not used, and an RSN field of 1 to 3 may be set to indicate that swapping is performed. Alternatively, one-bit new data indicator (NDI) and 2-bit RSN information may be set to indicate swapping or no swapping as follows.

TABLE 6

| NDI index | RV index | |
|---|---|---|
| 0 | 0 | No swapping |
| 1 | 0 | Swapping |
| 1 | 1 | No swapping |
| 1 | 2 | Swapping |
| 1 | 3 | No swapping |

If a redundant state exists in any control information field, necessary information may be added.

For example, if a redundant state exists in a preceding information filed shown in the above Table 1, states indicating swapping of a codeword CWA/CWB, which is necessary information, may be added to an empty state.

TABLE 7

| Codebook Index | Number of layers v | |
|---|---|---|
| | 1 | 2 |
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\1\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-1\end{bmatrix}$ | — |
| 4 | $\frac{1}{\sqrt{2}}\begin{bmatrix}1\\j\end{bmatrix}$ | — |
| 5 | $\frac{1}{\sqrt{2}}\begin{bmatrix}1\\-j\end{bmatrix}$ | — |

↓

| | | |
|---|---|---|
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\1\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-1\end{bmatrix}$ | $\frac{1}{\sqrt{2}}\begin{bmatrix}0 & 1\\1 & 0\end{bmatrix}$ |
| 4 | $\frac{1}{\sqrt{2}}\begin{bmatrix}1\\j\end{bmatrix}$ | $\frac{1}{2}\begin{bmatrix}1 & 1\\-1 & 1\end{bmatrix}$ |
| 5 | $\frac{1}{\sqrt{2}}\begin{bmatrix}1\\-j\end{bmatrix}$ | $\frac{1}{2}\begin{bmatrix}1 & 1\\-j & j\end{bmatrix}$ |

The upper side of Table 7 shows Table 1 and the lower side of Table 7 shows addition of a preceding matrix indicating codeword swapping to empty states of Table 1.

If more redundant states exist, other necessary information may be added.

In another exemplary embodiment of the present invention, the codebook shown in Table 1 may be modified to indicate that a specific codeword is disabled.

TABLE 8

| Codebook index | Number of layers v | |
|---|---|---|
| 0 | 1 | $\begin{bmatrix} 1 \\ 0 \end{bmatrix}$ |
| 1 | 1 | $\begin{bmatrix} 0 \\ 1 \end{bmatrix}$ |
| 2 | 1 | $\frac{1}{\sqrt{2}}\begin{bmatrix} 1 \\ 1 \end{bmatrix}$ |
| 3 | 1 | $\frac{1}{\sqrt{2}}\begin{bmatrix} 1 \\ -1 \end{bmatrix}$ |
| 4 | 1 | $\frac{1}{\sqrt{2}}\begin{bmatrix} 1 \\ j \end{bmatrix}$ |
| 5 | 1 | $\frac{1}{\sqrt{2}}\begin{bmatrix} 1 \\ -j \end{bmatrix}$ |
| 6 | 2 | $\frac{1}{\sqrt{2}}\begin{bmatrix} 1 & 0 \\ 0 & 1 \end{bmatrix}$ |
| 7 | 2 | $\frac{1}{2}\begin{bmatrix} 1 & 1 \\ 1 & -1 \end{bmatrix}$ |
| 8 | 2 | $\frac{1}{2}\begin{bmatrix} 1 & 1 \\ j & -j \end{bmatrix}$ |
| 9 | 2(null TX A) | $\frac{1}{\sqrt{2}}\begin{bmatrix} 1 & 0 \\ 0 & 1 \end{bmatrix}$ |
| 10 | 2(null TX A) | $\frac{1}{2}\begin{bmatrix} 1 & 1 \\ 1 & -1 \end{bmatrix}$ |
| 11 | 2(null TX A) | $\frac{1}{2}\begin{bmatrix} 1 & 1 \\ j & -j \end{bmatrix}$ |
| 12 | 2(null TX B) | $\frac{1}{\sqrt{2}}\begin{bmatrix} 1 & 0 \\ 0 & 1 \end{bmatrix}$ |
| 13 | 2(null TX B) | $\frac{1}{2}\begin{bmatrix} 1 & 1 \\ 1 & -1 \end{bmatrix}$ |
| 14 | 2(null TX B) | $\frac{1}{2}\begin{bmatrix} 1 & 1 \\ j & -j \end{bmatrix}$ |
| 15 | | |

In Table 8, a field 'number of layers' and a preceding information field shown in Table 1 are expressed in the same column, indexes 0 to 5 denote information for rank 1, and the other indexes denote information for rank 2. Especially, indexes 9 to 11 denote 'null Tx A' representing that a codeword A transmits null data, and indexes 12 to 14 denotes 'null Tx B' representing that a codeword B transmits null data.

The exemplary embodiment of the present invention proposes a method for including an indication whether or not swapping occurs in downlink control information as one-bit explicit information and implicitly indicating disabling of a specific codeword through another control information as shown in Table 8.

The following Table 9 indicates an example of using one-bit explicit information to indicate whether swapping occurs and using preceding information shown in Table 8 to indicate enable/disable information of a codeword.

TABLE 9

| | State | Content |
|---|---|---|
| One of indexes 0 to 5 in Table 8 | 1 | — |
| | 2 | — |
| One of indexes 6 to 14 in Table 8 | 1 | (no swapping CW A/B) |
| | 2 | (swapping CW A/B) |

In Table 9, state '1' or '2' denotes a state according to an explicit swapping flag. In Table 8, indexes 6 to 14 are for layer 2 and therefore denote different states depending on whether swapping occurs. Especially, indexes 9 to 14 represent that a specific codeword is disabled.

As described above, the same state may have various meanings using the control information field.

As another example, if the transport formats of first and second transport blocks of Table 3 have a meaning indicating that a data size is 0, and the state information of the following Table 10 can be expressed as in the example of Table 9. Namely, an explicit swapping flag is used to indicate whether swapping occurs and another control information, i.e., one or more combinations of, for example, NDI, redundancy version (RV), and MCS information, is used to indicate null Tx.

TABLE 10

| | State | Content |
|---|---|---|
| Indicating that transport formats of both a first transport block and a second transport block do not have a size of 0 | 1 | (no swapping CW A/B) |
| | 2 | (swapping CW A/B) |
| Indicating that a transport format of either a first transport block or a second transport block has a size of 0 | 1 | (null TX A) |
| | 2 | (null TX B) |

Meanwhile, an indication that the transport formats of both a first transport block and a second transport block have a data size of 0 may be expressed using various methods. One of them is to express a state indicating that a data size is 0 in a transport format field. Alternatively, the field may be not expressed when a data size is 0. If a meaning indicating that a first transport block is mapped to a codeword CW1 and a second transport block is mapped to a codeword CW2 is assigned, the transport format field of the first transport block may be eliminated to disable the codeword CW1 and the transport format field of the second transport block may be eliminated to disable the codeword CW2.

However, if a meaning indicating that one data unit is transmitted to the first transport block is assigned, the data size may be set to be transmitted through the transport format field of the first transport block irrespective of the codeword CW1 or CW2 when one data unit is transmitted. In this case, it is assumed that the codewords Cw1 and CW2 are explicitly or implicitly discriminated through any state information.

A state indicating that a data size is 0 may be added to the transport format fields of the first and second transport blocks. When using explicit swapping information, four necessary states according to this exemplary embodiment can be represented.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The method for transmitting control information according to the exemplary embodiments of the present invention is applicable by the same principle not only to the above-described 3GPP LTE system but also to any multiple antenna systems which can simultaneously transmit a maximum of 2 codewords and require swapping and disabling of a specific codeword.

What is claimed is:

1. A method for transmitting downlink control information in a multiple antenna system which can simultaneously transmit a maximum of two codewords, the method comprising:
    transmitting the downlink control information including first modulation and coding scheme (MCS) information, a first new data indicator (NDI) and a first redundancy version (RV) for a first information block, and second MCS information, a second NDI and a second RV for a second information block, wherein the first and second information blocks are transmitted through the two codewords; and
    transmitting additional downlink control information including at least a swapping indicator or enable/disable information, the swapping indicator indicating whether or not swapping occurs between the first and second information blocks transmitted through the two codewords, and the enable/disable information indicating whether or not any one of transmissions through the two codewords is disabled,
    wherein the swapping indicator is reserved when any one of the transmissions through the two codewords is disabled.

2. The method according to claim 1, wherein the additional control information indicates four states, the four states including:
    a first state in which the first and second information blocks transmitted through the two codewords are transmitted without swapping;
    a second state in which the first and second information blocks transmitted through the two codewords are transmitted with swapping; and
    third and fourth states in which one of the first and second information blocks transmitted through the two codewords is transmitted through one enabled codeword when any one of the transmissions through the two codewords is disabled.

3. The method according to claim 1, wherein the swapping indicator is transmitted within the downlink control information as one-bit explicit information, and wherein the enable/disable information is implicitly transmitted to a receiving side by one or more combinations of the first or second NDI, the first or second RV and the first or second MCS information.

4. A method for receiving downlink control information in a multiple antenna system which can simultaneously receive a maximum of two codewords, the method comprising:
    receiving the downlink control information including first modulation and coding scheme (MCS) information, a first new data indicator (NDI) and a first redundancy version (RV) for a first information block, and second MCS information, a second NDI and a second RV for a second information block, wherein the first and second information blocks are transmitted through the two codewords; and
    receiving additional downlink control information including at least a swapping indicator or enable/disable information, the swapping indicator indicating whether or not swapping occurs between the first and second information blocks transmitted through the two codewords, and the enable/disable information indicating whether or not any one of transmissions through the two codewords is disabled,
    wherein the swapping indicator is reserved when any one of the transmissions through the two codewords is disabled.

5. The method according to claim 4, wherein the additional control information indicates four states, the four states including:
    a first state in which the first and second information blocks transmitted through the two codewords are transmitted without swapping;
    a second state in which the first and second information blocks transmitted through the two codewords are transmitted with swapping; and
    third and fourth states in which one of the first and second information blocks transmitted through the two codewords is transmitted through one enabled codeword when any one of the transmissions through the two codewords is disabled.

6. The method according to claim 4, wherein the swapping indicator is received within the downlink control information as 1-bit explicit information, and wherein the enable/disable information is implicitly acquired by a receiving side by one or more combinations of the first or second NDI, the first or second RV and the first or second MCS information.

* * * * *